(12) United States Patent
Crescenzo

(10) Patent No.: US 8,973,732 B2
(45) Date of Patent: Mar. 10, 2015

(54) APPARATUS FOR POSITIONING MULTIPLE-LANE FRUIT, ESPECIALLY PEACHES

(76) Inventor: Biagio Crescenzo, Montecorvino Pugliano (IT)

( * ) Notice: Subject to any disclaimer, the term of this patent is extended or adjusted under 35 U.S.C. 154(b) by 0 days.

(21) Appl. No.: 14/232,380

(22) PCT Filed: Jul. 10, 2012

(86) PCT No.: PCT/IT2012/000209
§ 371 (c)(1),
(2), (4) Date: Jan. 13, 2014

(87) PCT Pub. No.: WO2013/008262
PCT Pub. Date: Jan. 17, 2013

(65) Prior Publication Data
US 2014/0131174 A1    May 15, 2014

(30) Foreign Application Priority Data
Jul. 12, 2011   (IT) .............................. RM2011A0364

(51) Int. Cl.
*B65G 47/84*    (2006.01)
*B65G 17/12*    (2006.01)
*B65G 47/248*   (2006.01)
*A23N 3/04*     (2006.01)

(52) U.S. Cl.
CPC ............. *B65G 17/12* (2013.01); *B65G 47/248* (2013.01); *B65G 2201/0211* (2013.01); *A23N 3/04* (2013.01)
USPC ......................................... 198/384; 198/385

(58) Field of Classification Search
USPC ................ 198/384, 385, 386, 803.14, 867.11
See application file for complete search history.

(56) References Cited

U.S. PATENT DOCUMENTS

| | | | |
|---|---|---|---|
| 2,220,511 A | 11/1940 | Carrell | |
| 2,254,595 A * | 9/1941 | Carroll | 198/384 |
| 2,265,515 A | 12/1941 | Carroll | |
| 2,563,443 A | 8/1951 | Wormser | |
| 2,830,531 A * | 4/1958 | Tarlton | 198/384 |
| 3,250,374 A * | 5/1966 | Anderson | 198/384 |
| 3,556,281 A * | 1/1971 | Margaroli et al. | 198/384 |
| 3,605,984 A | 9/1971 | Erekson et al. | |
| 3,695,322 A | 10/1972 | Anderson et al. | |
| 4,171,042 A | 10/1979 | Meissner | |
| 5,078,258 A * | 1/1992 | van der Schoot | 198/384 |
| 6,691,854 B1 * | 2/2004 | De Greef | 198/395 |
| 7,320,280 B2 * | 1/2008 | Politino et al. | 99/494 |
| 8,381,643 B2 * | 2/2013 | Nicholas | 99/547 |

OTHER PUBLICATIONS

International Search Report, dated Oct. 19, 2012, from corresponding PCT application.

* cited by examiner

*Primary Examiner* — James R Bidwell
(74) *Attorney, Agent, or Firm* — Young & Thompson

(57) ABSTRACT

A multiple-lane fruit positioning apparatus, especially suitable for peaches, includes a fruit flight conveyor having fruit holding flights with a number of recesses provided with an opening through which a part of the fruit protrudes. Associated to the fruit flight conveyor is an orientation device including rotating transverse shafts carrying rigidly connected orienting elements. The transverse shafts travel on an operation plane (Pa) that is parallel to a working stroke plane (Pc) of a tape formed by the fruit holding flights in time with a tape of the fruit flight conveyor so that each orienting element, rotating jointly with each transverse shaft by which it is borne, is in the recess opening in contact with the fruit contained therein and moves the fruit until a plane containing the suture line of each fruit is positioned at right angles with the longitudinal direction, and the stalk cavity thereof faces downwardly.

7 Claims, 6 Drawing Sheets

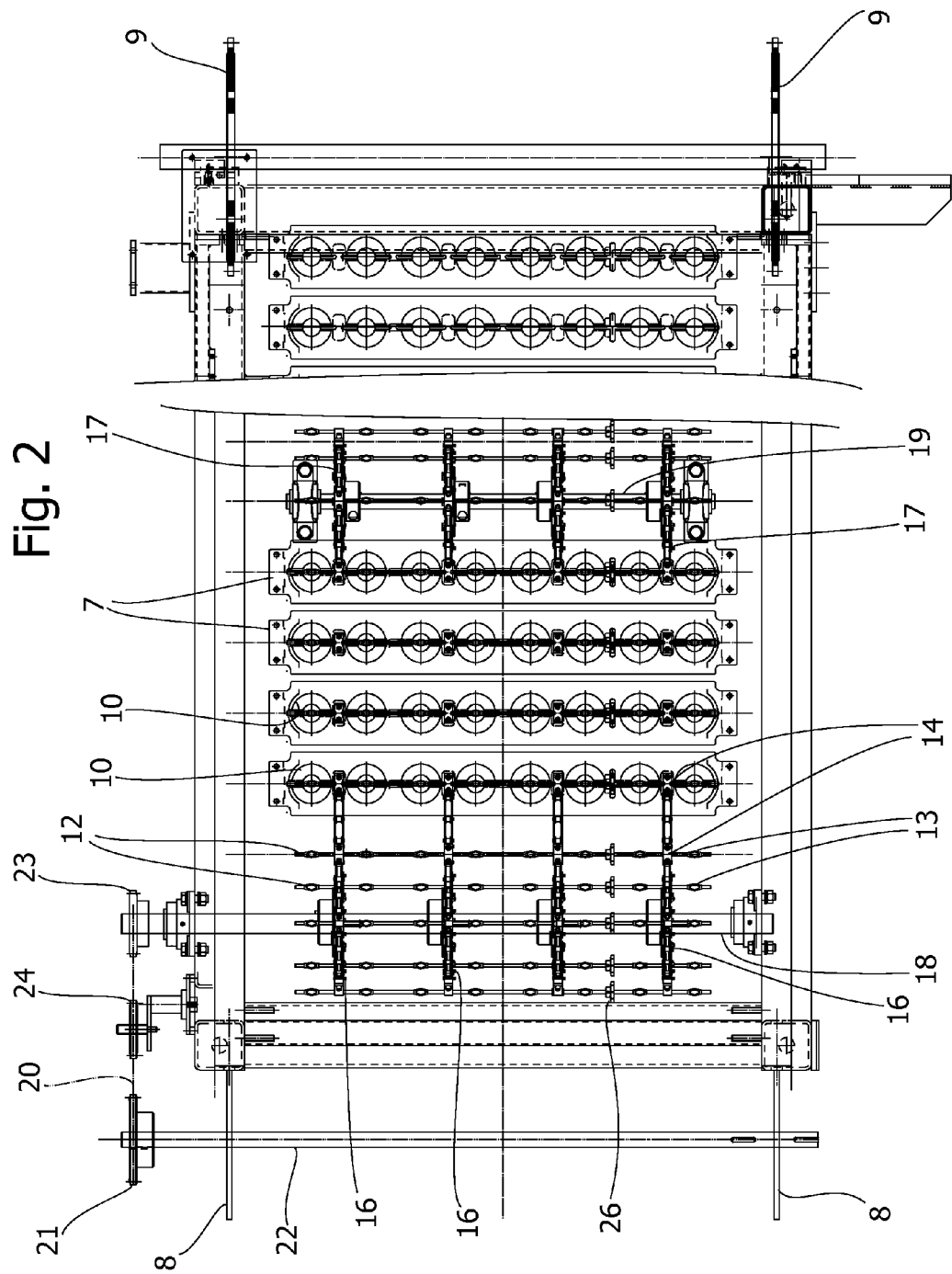

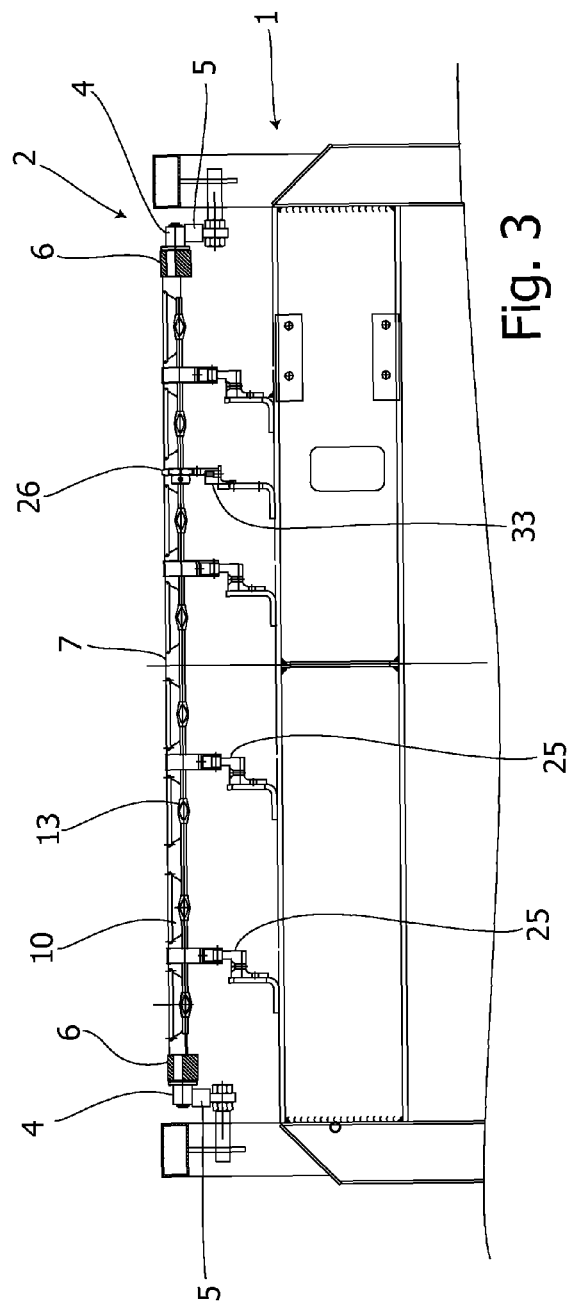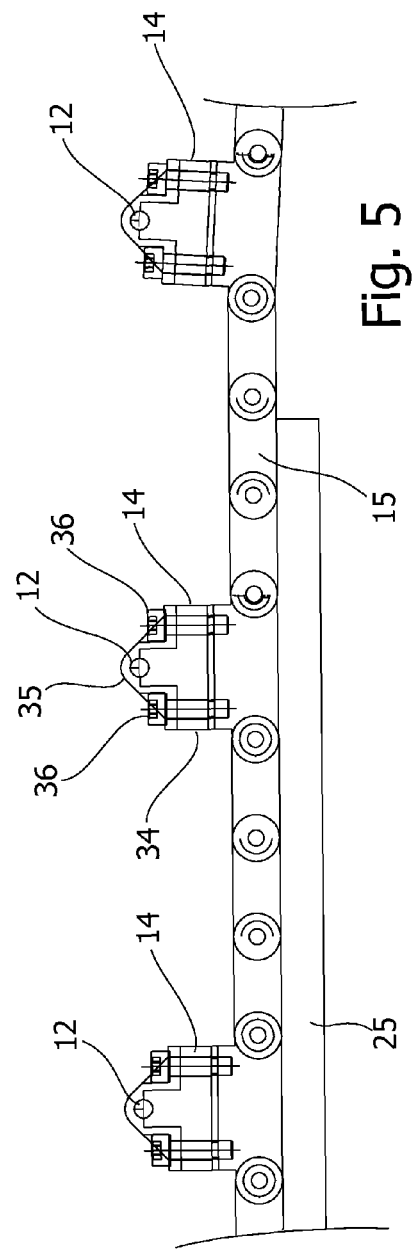

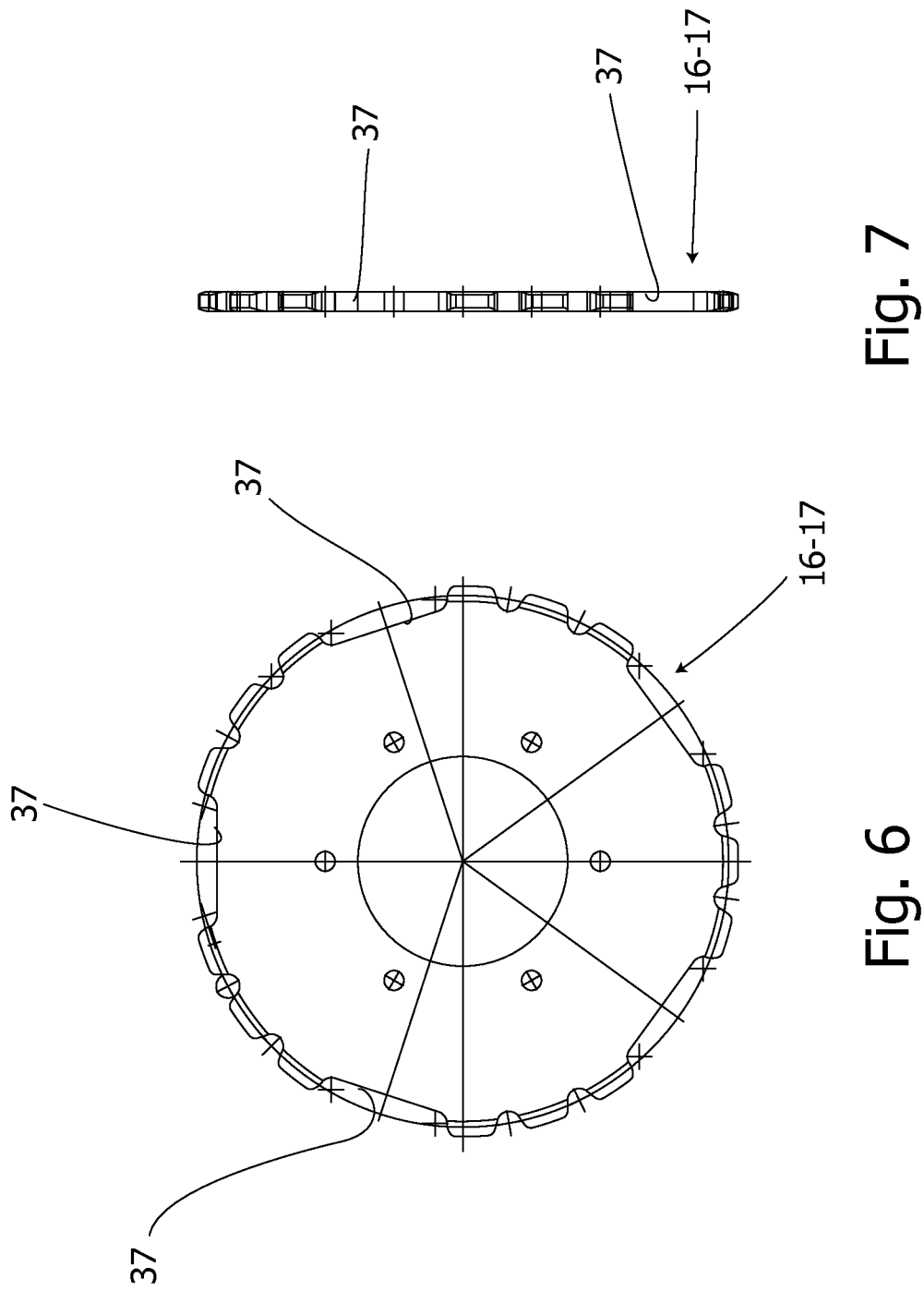

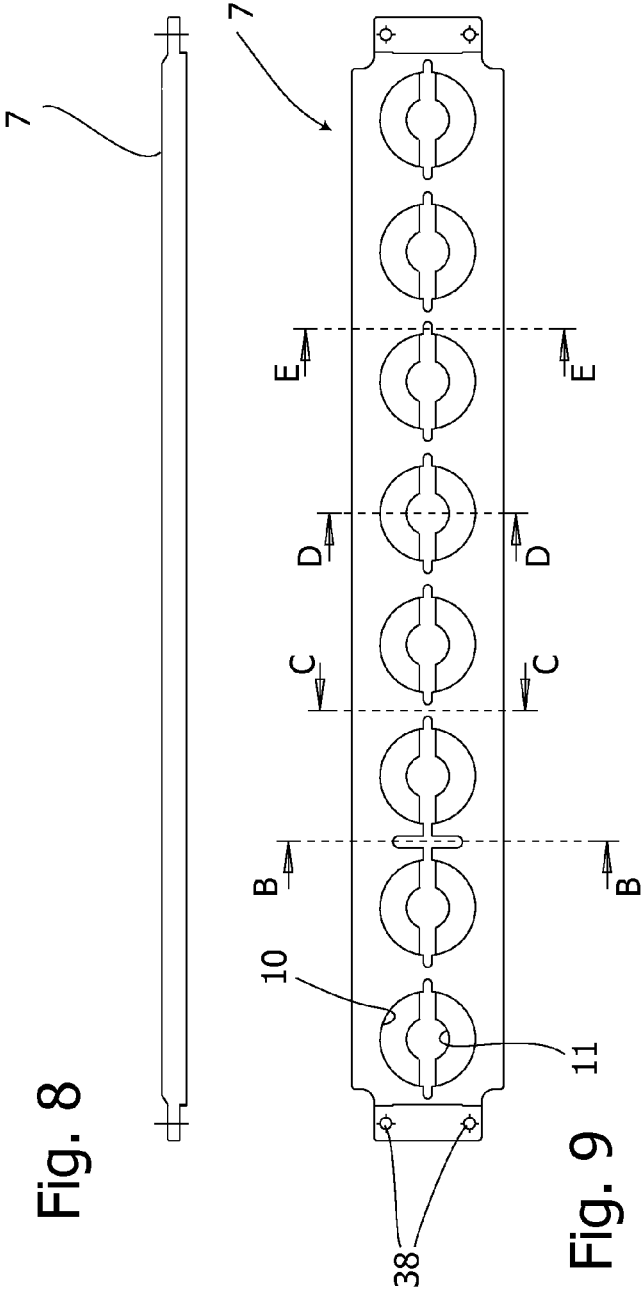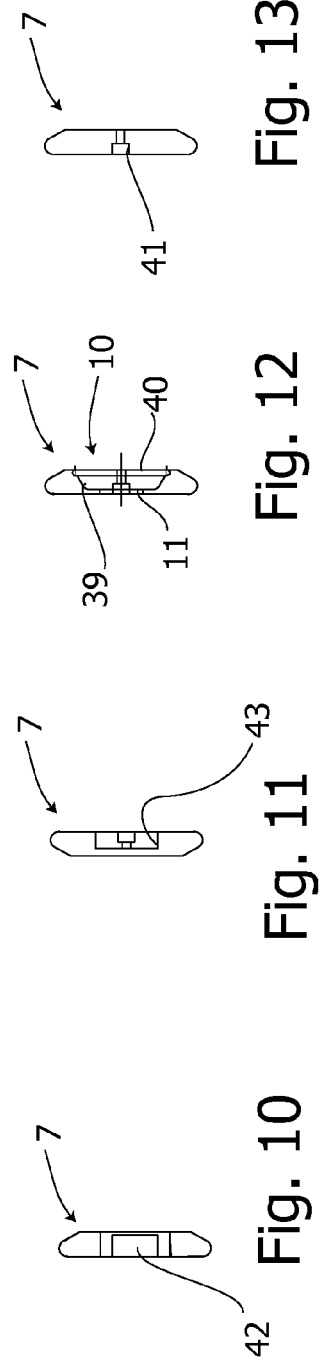

APPARATUS FOR POSITIONING MULTIPLE-LANE FRUIT, ESPECIALLY PEACHES

TECHNICAL FIELD

The present invention relates to a multiple-lane fruit positioning apparatus, especially suitable for peaches. Apparatuses of this type are used in fruit pitting machines.

BACKGROUND ART

U.S. Pat. No. 3,695,322, issued to Anderson et al. of FMC Corporation on Oct. 3, 1972, discloses a discontinuously operating apparatus for pitting peaches comprising a multiple-lane orientation station to align the peaches so that their suture plans are transversal to the direction of their movement along the apparatus. Flights or fruit cup plates are mounted on side chains of a conveyor. The side chains run on both idler sprockets and driving sprockets being positioned at the ends of the conveyor, i.e. in the proximity of a peach feeder on one hand, and of a cutting head on the other hand. The side chains are supported on a swinging frame in order to facilitate the operation of orientation.

A device for the orientation of fruits, which is positioned under the conveyor, includes transverse rows of aligning units that are mounted on carriages driven by chains. Each aligning unit has a "finder" wheel that projects into the cups through cup apertures and is rotated by its own complex drive mechanism. When the "finder" wheel is moved and slightly projects into the cup through its aperture, the peach is rotated by the "finder" wheel. When the flights and the aligning unit advance simultaneously, the "finder" wheel oscillates about its vertical axis through an arc of 45°. The oscillating flights prevent the peach to get out of the cup. When the peach is rolled with its stem cavity being towards the bottom of the cup, the "finder" wheel engages no longer the peach surface. As the flights and the aligning unit advance, the "finder" wheel is then raised to a position for finding the peach suture, and it is no longer rotated but is only subjected to oscillations about the vertical axis. From above it can be understood that the apparatus described by U.S. Pat. No. 3,695,322 is very complex, it contains a very high number of separately working parts and thus it is subjected to failures and malfunctions.

There is, among others, also the U.S. Pat. No. 4,171,042, granted to Meissner of California Processing Machinery on Oct. 16, 1979 that describes a continuous operating apparatus in order to position fruits of the drupe type.

A single-line conveyor is disclosed in which single fruit holding cups are mounted for rocking on support members which run being connected to a pair of driven chains in a vertical carousel conveyor. An orienting device comprises a third chain in backward motion with respect to the pair of driven chains, the third chain centrally engaging single sprockets, each of them driving a shaft with a rotating element positioned inside of each fruit holding cup.

It is understood that such a fruit orienting device as described in U.S. Pat. No. 4,171,042, is simpler than the one described in U.S. Pat. No. 3,695,322 thanks to the fact that each shaft provided with rotating element moves together with the conveyor and is driven by the latter.

Nowadays, in multiple-lane discontinuously operating pitting machines using blades, in which the fruit flight conveyor works in an intermittent motion because it stops during the cutting and the pitting of each row of fruits, a fruit orienting device is vertically moved from below to a working stroke plane of the fruit flight conveyor in order to properly set fruits that must be cut and pitted.

The fruit orienting device is vertically moved to the horizontally running conveyor during each stop thereof, in order to avoid collisions of the fruit orienting device with the conveyor. It should be noted that the fruit orienting device acts in a discontinuous way even if it works in a continuous way. As a result, the period in which the fruit orienting device acts that is only the sum of all stops, is not enough to get a correct positioning of all the fruits that is necessary for an efficient cut for pitting.

A solution to short time useful for obtaining a correct positioning of each fruit is represented by elongating the active stroke plane of the fruit flight conveyor. Another solution is to employ additional manpower that manually and individually provides to obtain the correct positioning of the fruits. Both solutions are expensive and not advantageous.

SUMMARY OF THE INVENTION

In this context, a technical task of the present invention is to propose a multiple-lane fruit positioning apparatus, especially peaches, which overcomes the drawbacks of the above mentioned prior art.

An object of the present invention is to provide a multiple-lane fruit positioning apparatus, especially suitable for peaches, able to allow a continuous action of orientation of the fruits even when the fruits advance on a fruit flight conveyor.

In particular, a further object of the present invention is to allow that, when positioning the fruits on a fruit flight conveyor, an orientation device can act in a continuous way on the fruits without colliding with the fruit flight conveyor.

The mentioned technical task and the specified objects are substantially achieved by a multiple-lane fruit positioning apparatus comprising the technical features set forth in one or more of the enclosed claims.

In particular, the present invention allows to use the whole time in which a fruit goes through in a traditional pitting machine, from a feeding station to a cutting section, thereby to obtain a total time of orientation up to ten times higher than the discontinuously operating apparatus, and therefore to obtain an orientation of the fruits that is effective and sufficient to eliminate the previously required manpower.

BRIEF DESCRIPTION OF DRAWINGS

Further features and advantages of the present invention will become more apparent from the description of a preferred but not exclusive embodiment of a multiple-lane fruit positioning apparatus, as illustrated in the accompanying drawings in which:

FIG. 2 is a partial top plan view of the apparatus in FIG. 1, with some parts being removed, for clarity's sake;

FIG. 3 is a cross-section view on an enlarged scale taken on line A-A in FIG. 1;

FIG. 5 is a partial front view on an enlarged scale of a portion of a chain for supports of transverse shafts of an orientation device in the apparatus according to the invention;

FIGS. 6 and 7 are a front view and a side view respectively on an enlarged scale of a pulley of the chain for the supports of the transverse shafts of the orientation device in the apparatus according to the invention;

FIGS. 8 and 9 are a side view and a front view respectively of a fruit flight of a conveyor on an enlarged scale in the apparatus according to the invention; and FIGS. 10 to 13 are cross-section views obtained along the lines B-B, C-C, D-D, and E-E respectively in FIG. 9.

DESCRIPTION OF THE PREFERRED EMBODIMENT

Figure 1:
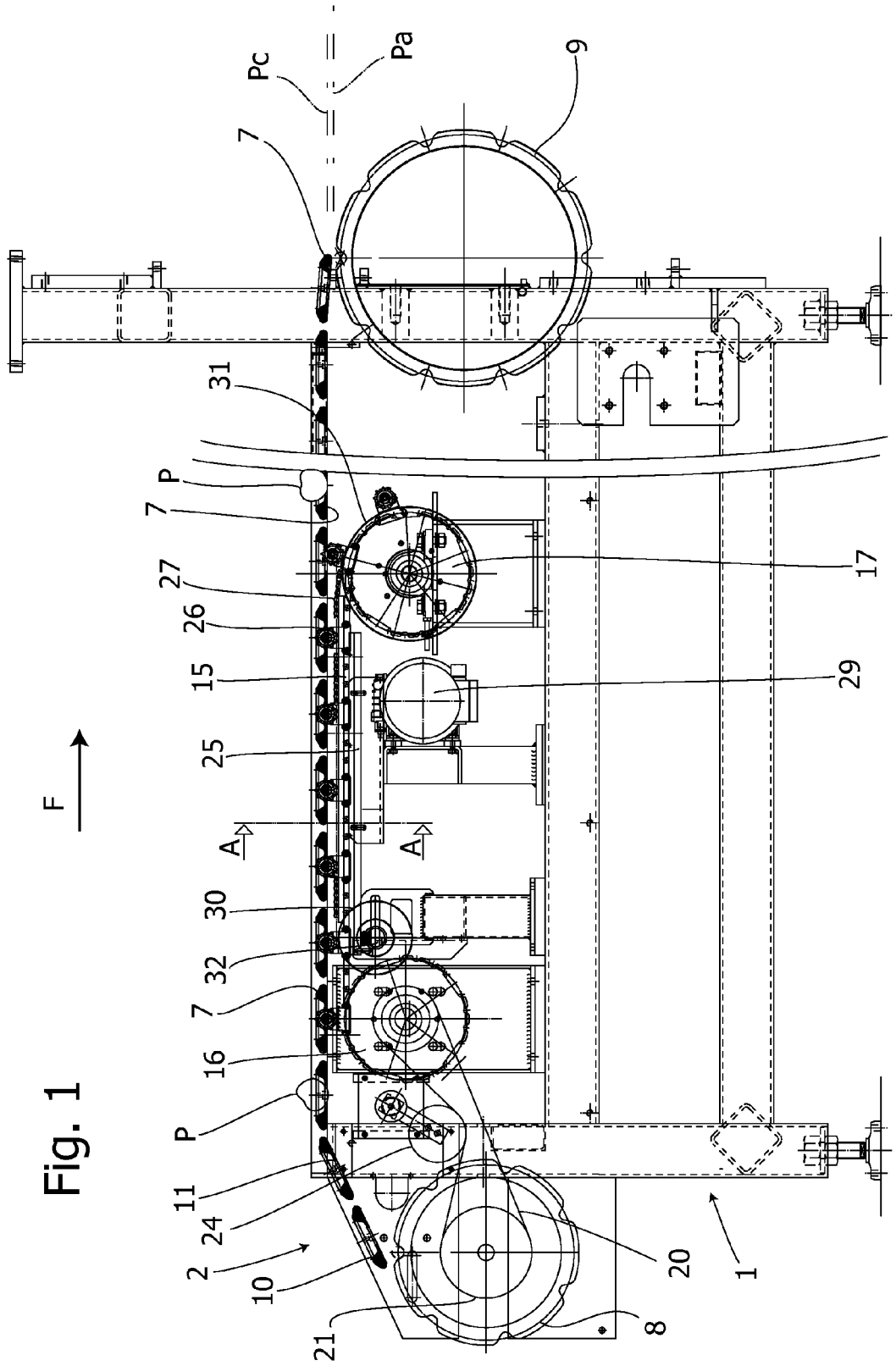
FIG. 1 is a diagrammatic longitudinal, partial and cut, cross-section view of a multiple-lane fruit positioning apparatus according to the present invention.

First referring to FIGS. 1 and 2 which are a partial cut longitudinal cross-section view and a top plan view respectively, of an embodiment of a multiple-lane fruit positioning apparatus according to the present invention. The apparatus can be used for drupes, in particular peaches, and these will be referred to in this detailed description. The apparatus comprises a longitudinal frame, generally indicated by 1, and a fruit flight conveyor 2 travelling in the longitudinal direction of said frame 1. As better shown in FIGS. 3 and 4, which are an enlarged cross-section view taken on line A-A in FIG. 1 and a partial perspective view respectively, of the apparatus in FIG. 1, the fruit flight conveyor 2 is constituted, according to the conventional technique, by a plurality of transverse rods 3. The transverse rods 3 are longitudinally equally spaced by a pitch depending also on size of the fruits to be transported, in this case peaches. The peaches are fed on the fruit flight conveyor 2 in a feeding station (not shown) on the left side of FIGS. 1, 2 and 4 and moved rightward according to a arrow F to a cutting and pitting station, also not shown. The transverse rods 3 of the fruit flight conveyor 2 are provided, at their opposite ends, with rollers 4 (FIG. 3) rolling on rails 5 which are rigidly connected to the longitudinal frame 1 of the apparatus. The transverse rods 3 are connected to each other near the opposite ends in succession by means of mesh members 6 of a known type. The mesh members 6, which connect the transverse rods 3, support fruit holding flights 7, which will be described in detail later on, with reference to FIGS. 8 to 13 which are respectively a side view and a front view of a fruit holding flights 7 and cross-section views obtained along the lines B-B, C-C, D-D, and E-E in FIG. 9 of the same fruit holding flight 7.

The rollers 4 engage pairs of wheels 8, 8 and 9, 9, that are mutually coupled by respective shafts, at opposite ends of the fruit flight conveyor 2, upon which a belt that is formed by the fruit holding flights 7, being connected in succession by mesh members 6, travels. For simplicity's sake, in FIGS. 1 and 2 the motor that drives the wheels 8, which are the driving wheels in the fruit flight conveyor 2, is not shown. Each fruit holding flights 7 is shaped with a number of recesses 10 being sized according to the fruit to be transported and crosswise spaced. Each recess 10 is inferiorly provided with an opening 11, as better shown in FIGS. 9 and 12, through which a part of a peach P protrudes (FIG. 1).

As above mentioned, the fruit holding flights 7 and the relevant mesh members 6 form the belt which substantially lies in a working stroke plane to Pc. A fruit orienting device is located under the working stroke plane Pc of the belt of the fruit flight conveyor 2.

The fruit orienting device comprises a plurality of transverse shafts 12 that are longitudinally equally spaced by the same pitch of the transverse rods 3 of the fruit flight conveyor 2. In FIG. 2, in order to make the transverse shafts 12 visible, fruit holding flights 7 have been removed and, for clarity's sake, some parts which should be visible, such as means for the rotation of the transverse shafts 12, have been removed. A number of orienting elements 13 are rigidly connected with the transverse shafts 12 and spaced along them with the same pitch of the number of recesses 10 along the fruit holding flights 7. The axes of the transverse shafts 12, under the working stroke plane Pc of the conveyor belt, lie on an operation plane Pa in which their orienting elements 13 act for positioning the fruits. The traces of working stroke plane Pc of the conveyor belt and of the operation plane Pa of the transverse shafts 12 are schematically indicated in FIG. 1.

The orienting elements 13 are of a known type, for example diamond-shaped, and they are not described in further detail for this reason. They may also be of a different kind.

According to the invention, each transverse shaft 12 is pivotally mounted on at least two support members 14, best shown in FIG. 5, which is a partial front view of a chain 15 for the support members 14 of the transverse shafts 12. The chains 15, on which the support members 14 are rigidly connected, are the type of currently preferred flexible transmission. The chains 15 are four in this embodiment of the invention and run longitudinally parallel to the operation plane Pa of the transverse shafts 12, in close proximity to the working stroke plane Pc of the belt of the fruit flight conveyor 2, i.e. in the same direction of the latter, on respective driving pulleys 16 and driven pulleys 17 which are mounted on respective pulley shafts 18, 19.

In this way, the transverse shafts 12 travel on the operation plane Pa that is parallel to the working stroke plane Pc of the conveyor belt, at, the same tangential speed of the transverse rods 3 of the fruit flight conveyor 2. Only the active stroke of the transverse shafts 12 and the working stroke of the conveyor belt 2 are represented in FIG. 1, for clarity's sake.

The driving pulleys 16 are driven in synchronism with the wheel 8 of the fruit flight conveyor 2, by a transmission chain 20 which is mounted on a gear 21 rigidly connected to a shaft 22 of the wheels 8 of the fruit flight conveyor 2, and by a gear 23 rigidly connected with a shaft 18 of driving pulleys 16 of the orienting device, with the interposition of a return wheel 24.

Thanks to the synchronism mentioned above, each orienting element 13, jointly rotating with each transverse shaft 12 supporting it, is in the said recess opening 11 in contact with the fruit contained therein.

Figure 4:
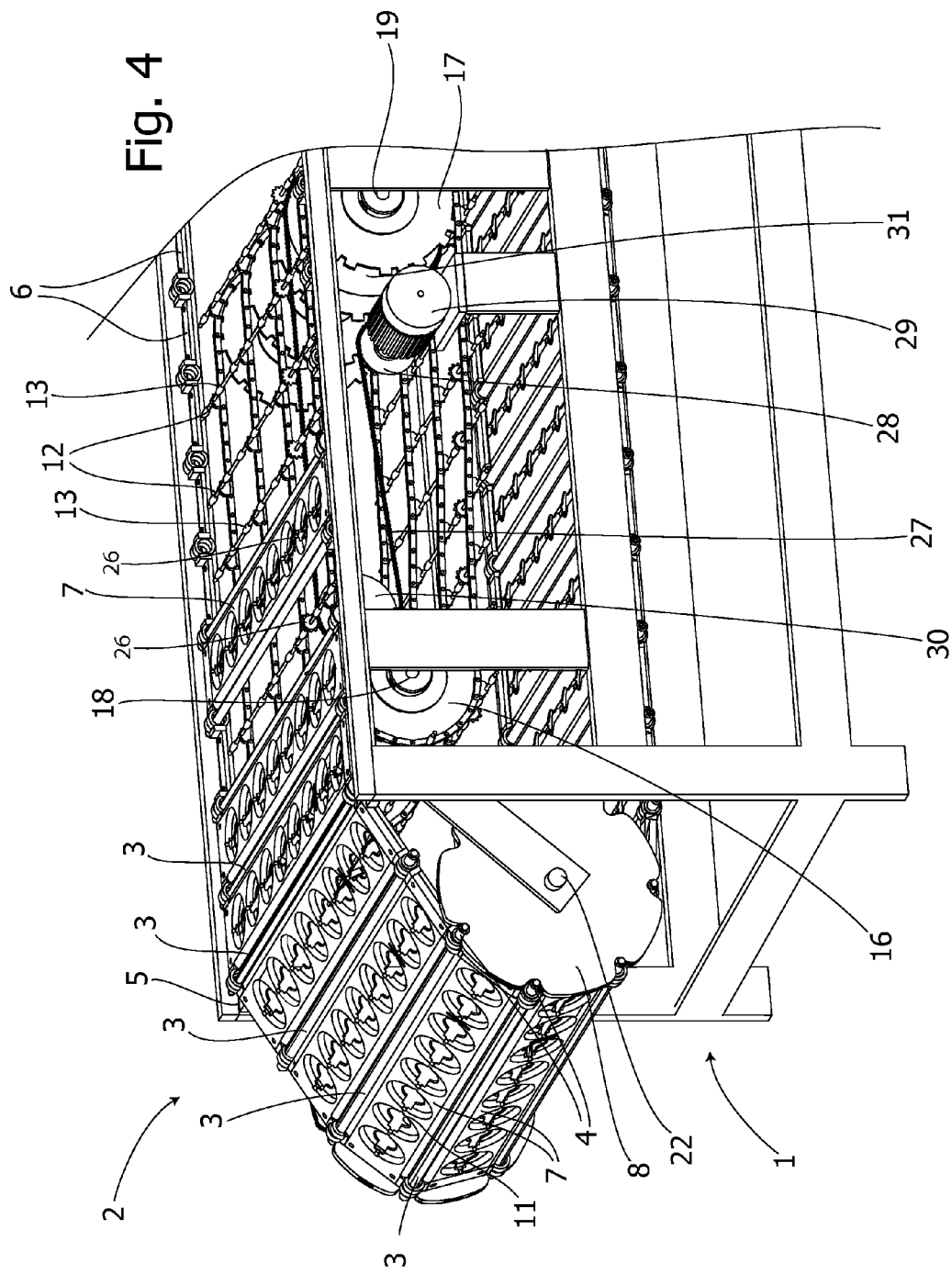
FIG. 4 is a partial perspective view of the apparatus in FIG. 1, with some parts being removed, for clarity's sake.

This is shown in FIGS. 1 and 4, where the fruit holding flights 7, travelled by the driving wheel 8, and the transverse shafts 12 from the driving pulley 16 converge to lie in the working stroke plane Pc of the fruit flight conveyor 2 and in the operation plane Pa of the transverse shafts respectively.

Each transverse shaft 12 of the orientation device is pivotally mounted on four support members 14 fixed on respective meshes of the same number of chains 15. In the portion of active stroke of the transverse shafts 12 in the plane Pa, the chain 15 travels on guides, preferably made of antifriction material, indicated as 25 in FIGS. 1, 3 and 5.

As better shown in FIG. 4, each transverse shaft 12 is furthermore provided with at least one driven toothed wheel 26 which, rigidly connected with each transverse shaft 12, meshes a roller chain 27. The roller chain 27 is driven by a pinion 28 keyed on the shaft of a motor 29, mounted on the longitudinal frame 1 of the fruit flight conveyor 2, and travels on pulleys 30, 31. The pulleys 30, 31, along which the roller chain 27 runs being driven by the pinion 28, have no teeth circumferentially so as not to intersect their own movement with the one of the driven toothed wheel 26, in their mutual engagement with it. The pulleys 30, 31 are idly mounted respectively on a shaft 32, and on the pulley shaft 19 of the orientation device (FIG. 1).

Thanks to the orienting elements 13 continuously moved by the roller chain 27 close to the opening 11 of each recess 10, the peach P, which is is contained inside the recess 10, is rotated to position the plane containing the suture line of each peach P and its stalk cavity facing downwards orthogonal to the longitudinal direction of travelling of the conveyor belt. The continuous movement is permanently effective because the orienting elements are active on peach P (FIG. 1) for all the time in which they are located in correspondence with the opening of a recess 10 of the fruit holding flights 7.

The rotation speed of the orienting elements 13 is synchronised with the forward speed of the chain 27 so as the rotation speed is not so high to cause the peach P to come out its recess which advances with the conveyor.

In an alternative embodiment (not shown), each transverse shaft 12 of the orientation device is rotated by the driven toothed wheel 26 rigidly connected to each shaft, the wheel which meshes a fixed rack rigidly connected to the frame of the fruit flight conveyor. However, in this alternative embodiment the orienting element 13 would rotate at a speed not sufficient to rotate the peaches until to take them very probably in the right position, and also it would be stationary when the conveyor belt is stationary in the cutting and pitting station.

Referring now to FIGS. 3 and 5, as therein shown, the chain 15 of the support members 14 of each transverse shaft 12 carrying the orienting elements 13 travels on its active portion of the operation plane Pa on a guide 25 that is mounted on a cross member of the frame 1, which allows the chain 15 not to droop and thus to maintain the contact of the orienting elements 13 with the peaches P. Analogously, also the chain 27 is supported by a guide 33, which prevents the chain 27 to droop (FIG. 3).

Each support member 14 carrying the transverse shafts 12 has a fixed part 34 rigidly connected to the chain 15 and a removable part 35 that retains the transverse shafts 12, the removable part 35 being joined to the fixed part 34 by a threaded means 36.

Reference is made now to FIGS. 6 and 7, which are a front view and a side is view respectively, of a driving pulley 16 or driven pulley 17 of the chain 15.

As one can see, each pulley 16, 17 has no teeth in correspondence of the support members 14, and instead of the teeth each pulley 16, 17 has cavities indicated generically as 37.

Reference is made now to FIGS. 8 and 9, which are respectively a side view and a front view of a fruit holding flight 7 of the conveyor 2 of the apparatus according to the invention. The fights 7 are substantially rectangular, made of a suitable plastic material, reinforced with metal bars, if any. Holes 38 are performed in ends of the flights in order to receive threaded connecting means with the mesh members 6.

The fruit holding flights 7 are shaped with the series of recesses 10 that are dimensioned according to the fruit to be transported and transversely spaced as the orienting elements 13, or vice versa.

As shown in FIGS. 10 to 13, which are cross-section views obtained along the lines B-B, C-C, D-D, and E-E, respectively, of FIG. 9, each recess 10 has inferiorly a recess opening 11, through which a part of the fruit protrudes. As shown in FIG. 12, each recess 10 is obtained in the fruit holding flight 7 by means of a frustoconical cavity 39 facing downward that inferiorly has the recess opening 11, being cylindrical with a diameter smaller than the lower base of the frustoconical cavity 39. Each recess has an upper cylindrical edge 40 having a diameter slightly greater than the upper base of the frustoconical cavity 39 in order to hold the fruit inside of the recess 10.

As shown in FIG. 13, the recess 10 is provided with opposite side cutouts 41 adjacent the recess opening 11 for receiving the transverse shafts 12.

Furthermore the fruit holding flights 7 have through cutouts 42 adapted to receive the driven toothed wheels 26, and spaces 43 adapted to receive the support members 15 for the transverse shafts during the active stroke of the orienting elements of the orienting apparatus according to the present invention.

It should be understood that the foregoing description represents only one embodiment of the multiple-lane fruits positioning apparatus according to the invention having a scope defined by the attached claims.

The invention claimed is:

1. A multiple-lane fruit positioning apparatus, especially suitable for peaches, comprising a longitudinal frame and a fruit flight conveyor traveling in the longitudinal direction of said longitudinal frame, the fruit flight conveyor being constituted by a plurality of transverse rods longitudinally equally spaced by a pitch depending also on the size of the fruit to be transported, the transverse rods being provided, at their opposite ends, with rollers rolling on rails that are fixed to the longitudinal frame and connected to each other near the opposite ends in succession by means of mesh members bearing fruit holding flights, said rolling rollers engaging wheels in opposite ends of the fruit flight conveyor, the fruit holding flights being shaped with a number of recesses sized according to the fruit to be transported and crosswise spaced, each recess being inferiorly provided with an opening through which a part of the fruit protrudes, the fruit holding flights and the related mesh members forming a tape under a working stroke plane of which an orientation device for the fruits is placed including a plurality of transverse shafts that are longitudinally equally spaced with the same pitch of the transverse rods of the fruit flight conveyor, each bearing a number of orienting elements transversely spaced like said number of recesses, characterized in that each transverse shaft is rotatably mounted to at least two support members rigidly connected to their flexible transmission means longitudinally running on respective driving and driven pulleys for forwarding the transverse shafts, said driving and driven pulleys being mounted on respective pulley shafts, the transverse shafts traveling on an operation plane for handling the fruits that are parallel to the working stroke plane of the fruit flight conveyor at the same tangential speed of the transverse rods of the fruit flight conveyor so that each orienting element, rotating jointly with each transverse shaft by which it is borne, is in the said recess opening in contact with the fruit contained therein and moves the fruit until a plane containing a suture line of each fruit is positioned at right angles with the longitudinal direction, and a stalk cavity thereof faces downwardly.

2. The apparatus according to claim 1, characterized in that each transverse shaft of the orientation device is rotated through at least one driven toothed wheel being keyed to each transverse shaft and meshing a roller chain, which is driven by a pinion keyed on the shaft of a motor mounted on the longitudinal frame of the fruit flight conveyor, the roller chain running on pulleys, one pulley of which is idle mounted to the driven shaft of said pulley shafts.

3. The apparatus according to claim 1, characterized in that the flexible transmission means of the support members of each transverse shaft is chains and the driving and driven pulleys thereof have no teeth in correspondence with said support members.

4. The apparatus according to claim 2, characterized in that said pulleys, along which the roller chain runs being driven by the pinion, have no teeth circumferentially.

5. The apparatus according to claim 3, characterized in that said chains of the support means for the transverse shafts rest on support rails in said operation plane for handling the fruits.

6. The apparatus according to claim 5, characterized in that said support members for the transverse shafts have a fixed part rigidly connected to the chain and a removable part, which retains these transverse shafts and is attached to the fixed part by threaded means.

7. The apparatus according to claim 1, characterized in that each of said recesses is made in said fruit holding flight with a frustoconical cavity facing downward, which has inferiorly said recess opening which is cylindrical with a diameter smaller than the lower base of the frustoconical cavity, and is provided with opposite side cutouts adapted to receive the transverse shafts, each of the recesses having an upper cylindrical edge with a diameter slightly greater than the upper base of the frustoconical cavity in order to hold the fruit inside of the recess.

* * * * *